ALEXANDER CONNELLEY, OF MILAN, INDIANA.

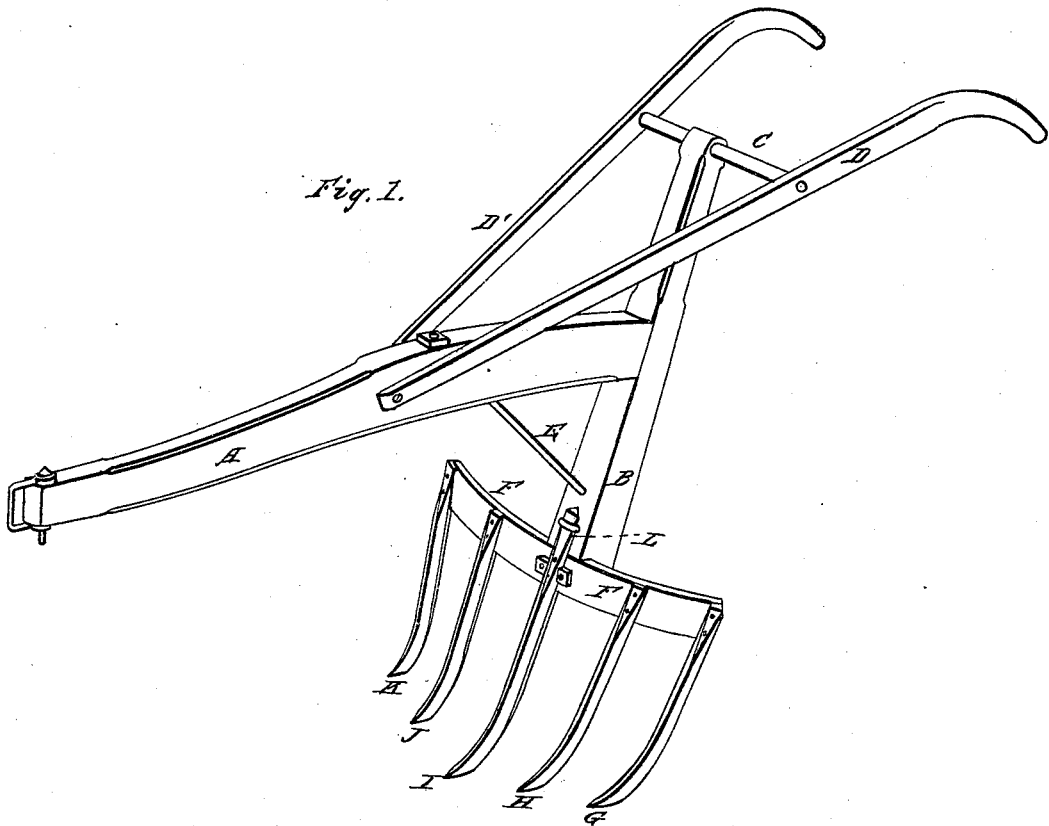
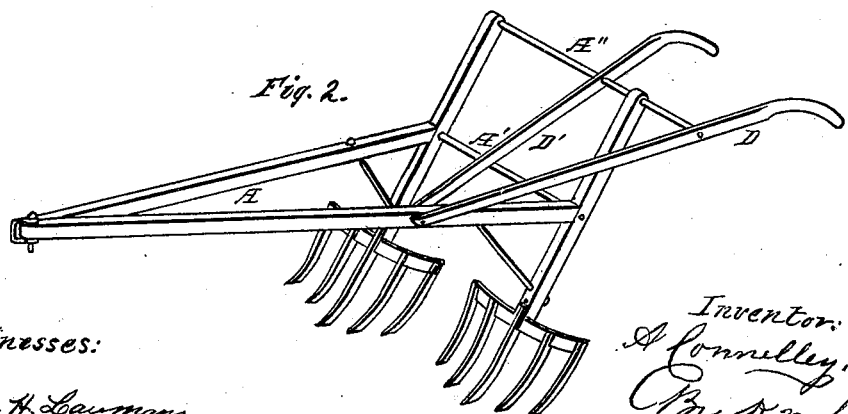

Letters Patent No. 88,136, dated March 23, 1869.

IMPROVEMENT IN CULTIVATORS.

The Schedule referred to in these Letters Patent and making part of the same.

*To whom it may concern:*

Be it known that I, ALEXANDER CONNELLEY, of Milan, Ripley county, Indiana, have invented a new and useful Cultivator; and I hereby declare the following to be a full, clear, and exact description thereof, reference being had to the accompanying drawings, making part of this specification.

This invention relates to an implement which, without requiring more power than is applied to the common cultivator, or shovel-plow, in the cultivation of corn or root-crops, will stir the ground to the depth of six or more inches, and can be run in close proximity to the plants, as it is not liable to cover them up, seeing that no furrow is thrown from it.

In the drawings—

Figure 1 is a perspective view of my improved cultivator, in single form; and

Figure 2 is a like view, in double form, in which case the row is straddled, both sides being cultivated at once.

In fig. 1, the beam A, standard B, cross-bar C, handles D D', and brace E, may be of usual construction.

Bolted to the standard B is a rearwardly-curved cross-bar, or head F, secured to which is a series of teeth, G H I J K, made of square steel. These teeth have a forward curve, as they extend downward, and their angles are presented longitudinally and transversely to the direction of draught.

The middle tooth I extends both above, and below, and forward of the other teeth, and the teeth H J extend below those, G K, which conformation, together with a slight inward curve given to the teeth G H J K, insures steadiness in running, as the penetration of the teeth is greater toward the centre; and the tooth I forms a fulcral point, upon which the implement is turned in guiding.

The central tooth I passes upward above the cross, or head-bar F, and has independent attachment to the standard above the said bar, by a screw-threaded staple L, which connection serves to give rigidity and strength to the operative parts.

The bar F has a backward curve, giving a lateral-curved contour, which serves to turn the large clods aside, preventing clogging of the implement.

The implement is found applicable to the spreading of manure, and it is not materially affected by corn-stalks, as those lying upon the surface are pushed aside, while those beneath are cut through by the forward corner of the teeth.

In fig. 2 is shown an arrangement in which the operative parts are duplicated, and attached to an angular frame A A' A", in which form it is used to cultivate both sides of the corn-row at the same time, the operator passing to the left of the row under treatment.

I claim herein, as new, and of my invention—

The curved teeth G H I J K, secured to the rearwardly-curved head, or cross-bar F, the said teeth having an outwardly-diminishing length, as represented and described.

In testimony of which invention, I hereunto set my hand.

ALEX. CONNELLEY.

Witnesses:
  GEO. H. KNIGHT,
  JAMES H. LAYMAN.